United States Patent [19]
Okamoto et al.

[11] Patent Number: 5,566,449
[45] Date of Patent: Oct. 22, 1996

[54] PROCESS FOR PRODUCING A SHAFT CLAMPING MEMBER

[75] Inventors: Kenji Okamoto; Hiroyuki Horimura; Masahiko Minemi, all of Saitama; Yoshinobu Takeda, Hyogo; Yoshishige Takano, Hyogo; Toshihiko Kaji, Hyogo, all of Japan

[73] Assignees: Sumitomo Electric Industries, Ltd., Osaka; Honda Giken Kogyo Kabushiki Kaisha, Tokyo, both of Japan

[21] Appl. No.: 292,691

[22] Filed: Aug. 18, 1994

[30] Foreign Application Priority Data

| Aug. 19, 1993 | [JP] | Japan | 5-205074 |
| Sep. 1, 1993 | [JP] | Japan | 5-217512 |

[51] Int. Cl.$^6$ .................................................. B23P 15/10
[52] U.S. Cl. ................ 29/888.092; 29/425; 29/DIG. 31; 74/579 E
[58] Field of Search .......................... 29/888.09, 888.092, 29/897.2, 527.5, 422, 425, DIG. 18, DIG. 31; 72/360, 377; 420/548, 550; 419/30, 27; 74/567, 579 E

[56] References Cited

U.S. PATENT DOCUMENTS

| 2,265,839 | 12/1941 | Hufferd et al. | 72/377 X |
| 2,287,251 | 6/1942 | Jones | 29/DIG. 31 X |
| 4,198,879 | 4/1980 | Hornak et al. | 29/888.09 X |
| 4,688,466 | 8/1987 | Burkdoll et al. | 102/261 |
| 4,693,139 | 9/1987 | Mukai et al. | 74/579 |
| 4,923,674 | 5/1990 | Weber | 419/27 |
| 4,992,117 | 2/1991 | Okubo et al. | 420/535 X |
| 5,109,605 | 5/1992 | Hoag et al. | 29/888.092 X |

FOREIGN PATENT DOCUMENTS

| 167320A2 | 1/1986 | European Pat. Off. . | |
| 330830A1 | 9/1989 | European Pat. Off. . | |
| 432915A1 | 6/1991 | European Pat. Off. . | |
| 0598664 | 5/1994 | European Pat. Off. | 29/888.09 |
| 61-186433 | 8/1986 | Japan . | |
| 2247348 | 10/1990 | Japan . | |
| 578708 | 4/1993 | Japan . | |
| 6042526 | 2/1994 | Japan | 29/888.09 |

OTHER PUBLICATIONS

Search Report.
English language translation of Abstract of JP 61-186433.
English language translation of Abstract of JP 2-247348.

*Primary Examiner*—Peter Vo
*Assistant Examiner*—Khan Nguyen
*Attorney, Agent, or Firm*—Lyon & Lyon

[57] ABSTRACT

A connecting rod as a shaft clamping member includes a rod member and cap, each of which has mating faces at circumferentially opposite ends of a semi-circular recess and which are fastened to each other by bolts by matching the opposed mating faces to each other to define a crank pin hole by the two semi-circular recesses. The rod member and the cap are forgings formed from an aluminum alloy and simultaneously produced by forging powder preforms of the rod member and cap in a cavity having the desired shape of the connecting rod. After forging, the opposed mating faces have an infinite number of recesses and projections which are formed from the flow of the material during the forging and which are in a matched and fitted relation to each other. Thus, any misalignment between and in a direction parallel to the mating faces can be prevented to avoid the generation of a situation that only the rod member receives a stress. This achieves a prolongation in the life of the connecting rod of the aluminum alloy. The composition of the most desirable aluminum alloy includes, by weight, 7% ≦Fe<15%, 1% <Si<4% and between 1% and 3% of a metal selected from Ti, Zr, Mn, Ni, Cr, V, Mg and Mm (Misch metal) with the balance Al. The preferred forging temperature is between about 550° C. and 650° C.

4 Claims, 9 Drawing Sheets

FIG. 9 *PRIOR ART*

PROCESS FOR PRODUCING A SHAFT CLAMPING MEMBER

BACKGROUND OF THE INVENTION

1. Field of the Invention

The present invention relates to a shaft clamping member comprising first and second halves each of which has mating faces at circumferential opposite ends of a semi-circular recess, the first and second halves being fastened to each other by a plurality of threaded members in a state where the mating faces of both the halves are matched to each other to define a shaft-receiving hole by both the semi-circular recesses, and processes for producing the same.

2. Description of the Prior Art

Conventionally known shaft clamping members of a construction similar to that described above include a connecting rod for an internal combustion engine, comprised of a first half which is a rod member having a smaller end portion at one end and a semi-annular portion for a large end portion at the other end, and a second half which is a semi-annular cap fastened to the semi-annular portion of the rod member by threaded members, e.g., bolts, to form the connecting rod which can be mounted on or removed from a chank pin portion of the crankshaft of the engine.

In general, the connecting rod for an internal combustion engine is conventionally formed from a carbon steel for a strong mechanical structure.

As one countermeasure for accommodating an environmental problem, a reduction in fuel consumption in an internal combustion engine for vehicle is demanded. To meet this, a reduction in weight of a structural member, especially, a moving part, is effective. In this case, a reduction in the weight of the connecting rods, which are moving parts, provides a large effect in reduction of fuel consumption. It is desirable to develop a lightweight and inexpensive connecting rod, in place of the conventional connecting rod made of steel.

Thus, it would be desirable to form a connecting rod from an aluminum alloy, which is a light alloy, from the demand for the reductions in weight and cost.

However, a connecting rod of aluminum alloy is resiliently deformed under relatively low stress due to the fact that aluminum alloy has a lower rigidity than that of a steel. Therefore, a misalignment in a direction parallel to the mating faces of the rod member and the cap is liable to be produced between the mating faces. This results in a condition whereby the stress is received by only the rod member, and hence, the life of the rod member is considerably shortened.

To overcome the above disadvantage, it is effective to increase the axial tension of the bolt. However, if such a means is employed, a new problem arises that a seat surface of the bolt head is depressed, because the aluminum alloy has a lower rigidity and a lower creep strength than those of the steel bolt.

SUMMARY OF THE INVENTION

It is an object of the present invention to provide a shaft clamping member of the type described above, which is designed so that a misalignment, as described above, between the mating faces of the first and second halves of a light alloy can be reliably prevented by employing a relatively simple means.

To achieve the above object, according to the present invention, there is provided a shaft clamping member comprising first and second halves each of which has mating faces at circumferential opposite ends of a semi-circular recess, the first and second halves being fastened to each other by a plurality of threaded members in a state where the mating faces of both the halves are matched to each other to define a shaft-receiving hole by both the semi-circular recesses, wherein the first and second halves are forgings formed from light alloy and simultaneously produced by forging in a cavity having the desired shape of the shaft clamping member, and the opposed mating faces are formed from a flow of a material during the forging and have infinite numbers of recesses and projections which are in a matching and fitted relation to each other.

In the above shaft clamping member of this invention, the first and second halves are lightweight and have a high strength, because they are forgings formed of the light alloy. The misalignment between and in a direction parallel to the opposed mating faces of the first and second halves is reliably prevented by the infinite numbers of recesses and projections fitted to each other.

In this case, because the recesses and projections are formed from the flow of the material, they are arranged extremely irregularly and each has a very small size which cannot possibly be achieved by machining. Therefore, any stress produced between both the mating faces can be dispersed to enhance the durability of the recess-projection fitted structure in the mating faces.

Thus, it is possible to provide a shaft clamping member which is lightweight and has a high strength and a prolonged life.

It is another object of the present invention to provide a producing method of the type described above, by which a shaft clamping member of the type described above can be produced in an inexpensive and efficient manner.

To achieve the above object, according to the present invention, there is provided a process for producing a shaft clamping member comprising first and second halves each of which has mating faces at circumferential opposite ends of a semi-circular recess, the first and second halves being fastened to each other by a plurality of threaded members in a state where the mating faces of both the halves are matched to each other to define a shaft-receiving hole by both the semi-circular recesses, the process comprising the steps of: forming first and second preforms of light alloy having shapes approximating those of the first and second halves, heating both the preforms, placing both the preforms into a cavity having a shape of the shaft clamping member in a mold such that surfaces of the preforms corresponding to the mating faces are opposed to each other, subjecting the first and second preforms simultaneously to a forging step to form the first and second halves having infinite numbers of recesses and projections in a fitted relation to each other on the opposed mating faces, the recesses and projections being formed from the flow of the material during the forging, and fitting the recesses and projections on the mating faces when fastening the first and second halves together by the threaded members.

With the above producing process, machining of the mating faces of the first and second halves is not required and hence, the number of manufacture steps and the manufacture cost can be correspondingly reduced. In addition, as compared to the case where a connecting rod blank comprised of the first and second halves formed integrally is divided into two parts by cutting, the waste of the material due to the provision of a cutting margin is avoided and, at the same time, a reduction in the number of manufacture steps can be achieved.

Thus, it is possible to produce a shaft clamping member in an inexpensive and efficient manner.

The above and other objects, features and advantages of the invention will become apparent from the following description of a preferred embodiment taken in conjunction with the accompanying drawings.

DESCRIPTION OF THE PREFERRED EMBODIMENT

Figure 1:
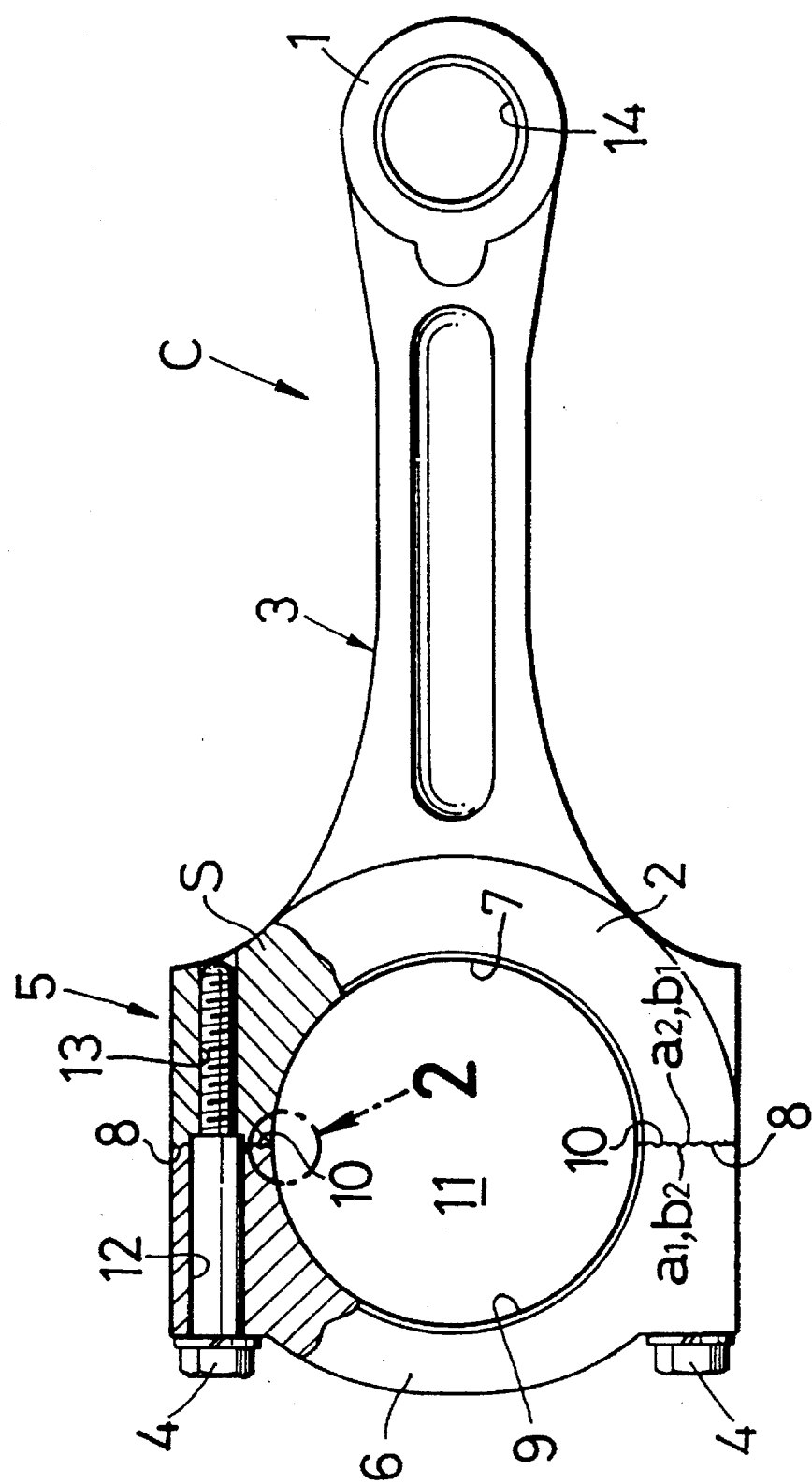
FIG. 1 is a cutaway plan view of a connecting rod.

Referring to FIG. 1, a connecting rod C as a shaft clamping member for an internal combustion engine is formed from an aluminum alloy which is a light alloy. The connecting rod C is comprised of a rod member 3 of aluminum alloy as a first half and a semi-annular cap 6 of an aluminum alloy as a second half. The rod member 3 includes a smaller end portion 1 at one end and a semi-annular portion 2 at the other end for forming a large end portion. The semi-annular cap 6 is fastened to the semi-annular portion 2 by a plurality, e.g., two (in the illustrated embodiment) of steel bolts 4 as threaded members, to form a large end portion 5 of the connecting rod C by cooperation with the semi-annular portion 2.

The semi-annular portion 2 of the rod member 3 has mating faces 8 at circumferentially opposite ends of a semi-circular recess 7, and the cap 6 also has mating faces 10 at circumferentially opposite ends of a semi-circular recess 9. The semi-annular portion 2 and the cap 6 are fastened to each other by the two bolts 4 with their opposed mating faces 8 and 10 matched with each other to define a crank pin bore 11 as a shaft-receiving bore by both the semi-circular recesses 7 and 9. Bolt insertion bores 12 are defined in the cap 6 so that they open through the opposite mating faces 10 of the cap 6, and internal threaded bores 13 are defined in the semi-annular portion 2, so that each of them is located coaxially with a corresponding one of the bolt insertion bores 12. In FIG. 1, reference character 14 identifies piston pin hole defined in the smaller end portion 1.

Figure 2:
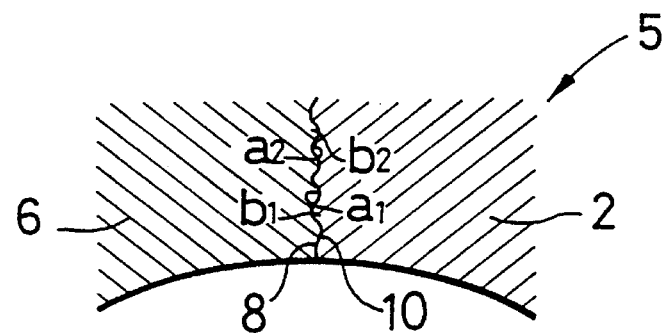
FIG. 2 is an enlarged view of the circled portion indicated by the arrow 2 in FIG. 1.

The rod member 3 and the cap 6 are forgings simultaneously produced by forging in a cavity having the same shape as the connecting rod, as will be described in detail below. The opposed mating faces 8 and 10 are formed by the flow of the material during forging to have an infinite number of recesses $a_1$, $a_2$ and projections $b_1$, $b_2$ which are in a matching and fitted relation to each other, as shown in FIG. 2.

Thus, the rod member 3 and the cap 6 are lightweight and of a high strength, because they are forgings of a light alloy. A misalignment between and in a direction parallel to the opposed mating faces 8 and 10 of the rod member 3 and the cap 6 is reliably prevented by the infinite number of recesses and projections $a_1$, $a_2$, $b_1$, $b_2$ fitted to each other.

In this case, because the recesses and projections $a_1$, $a_2$, $b_1$, $b_2$ are formed by the flowing of the material, they are arranged extremely irregularly, and each of them is of a very small size which cannot be possibly provided by any machining process. Thus, it is possible to reliably disperse any stress generated between the mating faces 8 and 10 to provide an improved durability by a recess-projection fitted structure in the mating faces 8 and 10.

A process for producing a connecting rod C of this invention by utilization of a powder forging technique now will be described.

Figure 3:
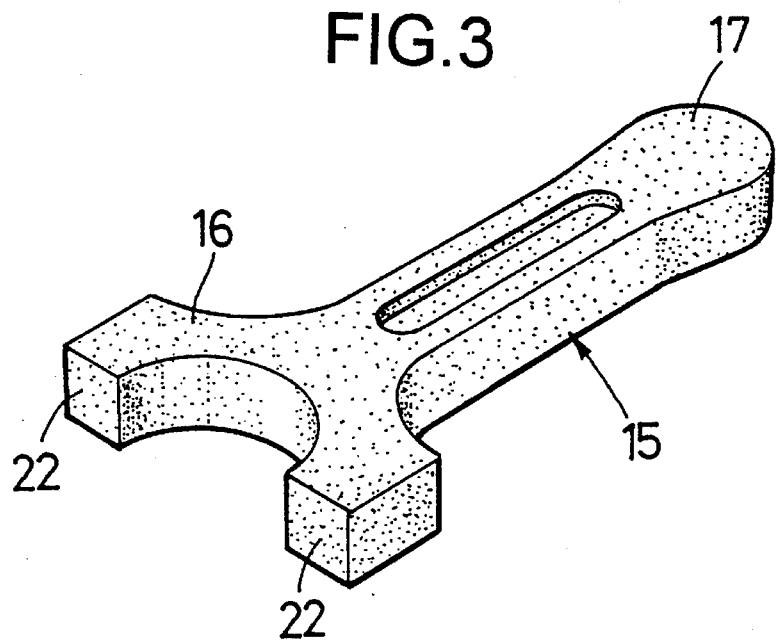
FIG. 3 is a perspective view of a first powder preform.

As shown in FIG. 3, an aluminum alloy powder is subjected to a cold compaction to produce a first powder preform 15 having a shape similar to the shape of the rod member 3. In this case, no internally threaded bores 13 are formed in the portion 16 corresponding to the semi-annular portion 2, and no piston pin hole 14 is formed in the portion 17 corresponding to the smaller end portion 1.

Figure 4:
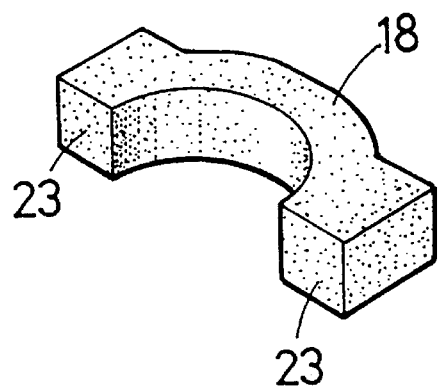
FIG. 4 is a perspective view of a second powder preform.

As shown in FIG. 4, an aluminum alloy powder is subjected to a cold compaction to produce a second powder preform 18 having a shape similar to the shape of the cap 6. In this case, no bolt insertion bores 12 are formed in the second powder preform.

Both the powder preforms 15 and 18 are heated to a forging temperature using a high frequency induction heating furnace.

Figure 5:
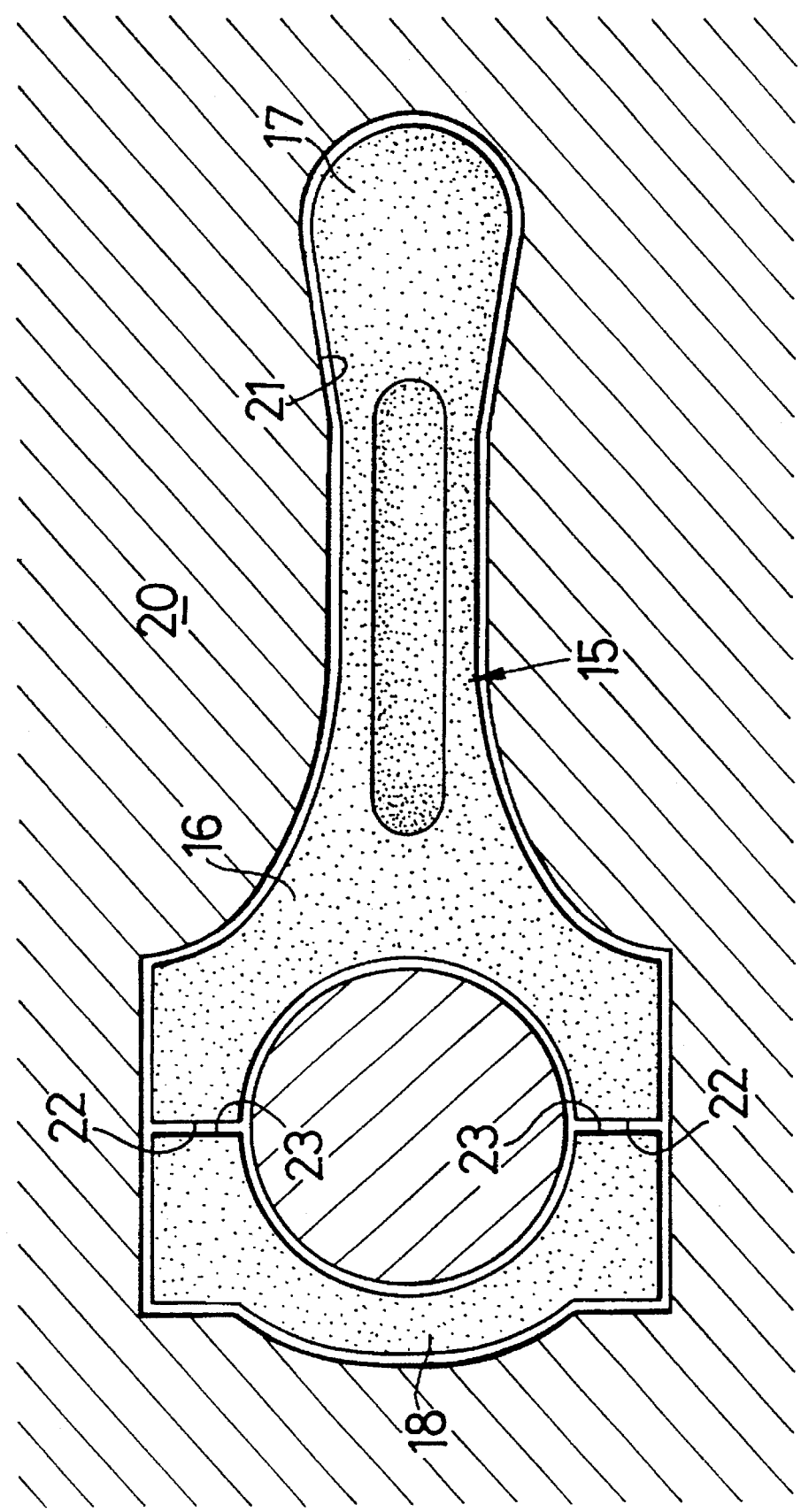
FIG. 5 is a cross-sectional plan view of the first and second powder preforms placed in a forging mold.

As shown in FIG. 5, the heated first and second powder preforms 15 and 18 are placed into a cavity 21 having the desired connecting rod shape defined in a lower die or mold 20 of a powder forging mold, so that their faces 22 and 23 corresponding to the mating faces 8 and 10 are adjacently positioned and opposed to each other.

The first and second powder preforms 15 and 18 are simultaneously subjected to a forging step to produce a rod member 3 and a cap 6. The rod member 3 and the cap 6 have an infinite number of recesses and projections $a_1$, $a_2$, $b_1$, $b_2$ formed in a fitted relation to each other due to the flow of the material from one of the faces 22, 23 toward the other face and/or vice versa during the forging step. The mating faces 8 and 10 of the rod member 3 and the cap 6 are in their mated states after the forging, but can be easily separated after ejection from the die 20.

The rod member 3 is subjected to a machining to define a piston pin hole 14, internally threaded bores 13 and the like, and the cap 6 is subjected to a machining to define bolt insertion bores 12. The mating faces 8 and 10 are not machined.

The opposed mating faces 8 and 10 of the rod member 3 and the cap 6 are matched to each other with their recesses and projections $a_1$, $a_2$, $b_1$, $b_2$ fitted to each other. The cap 6 is fastened to the rod member 3 by bolts 4.

The inner peripheral surface of the crank pin hole 11 defined by both the semi-circular recesses 7 and 9 is subjected to a machining, while assembled, for finishing the connecting rod C thereof.

With the above-described process, machining is not required for each of the mating faces 8 and 10 of the rod member 3 and the cap 6, and hence, the number of production steps and the production cost can be correspondingly reduced. In addition, as in a case where a connecting rod comprising a rod member 3 and a cap 6 formed integrally with each other is cut for division into two portions, the waste of material due to the provision of a cutting margin is avoided and at the same time, a reduction in the number of manufacture steps is provided.

Specific examples of the materials, processes, testing and the like of this invention now will be described.

A molten metal having an aluminum alloy composition of $Al_{91.5}$, $Fe_{5.5}$, $Ti_1$, $Si_2$ (each of the numerical values represents % by atom) was prepared and then subjected to an air atomizing process to produce an aluminum alloy powder. Thereafter, the aluminum alloy powder was subjected to a classification for selection of particles having a particle size equal to or less than 149 μm, thereby providing a first aluminum alloy powder. Constituents in the composition of this first aluminum alloy powder are represented by % by weight, as given in Table 1 below.

TABLE 1

|  | Chemical constituents (% by weight) | | | |
| --- | --- | --- | --- | --- |
|  | Fe | Ti | Si | Al |
| First Al alloy powder | 10.67 | 1.66 | 1.95 | Balance |

A second molten metal having an aluminum alloy composition represented by A2024—25% (by weight) Si, was then likewise subjected to an air atomizing process and a classification for selection of particles having a particle size equal to or less than 149 μm, thereby providing a second aluminum alloy powder.

EXAMPLE A

Using the first aluminum alloy powder, a connecting rod $C_1$ was produced according to the above-described procedure.

In the compaction of the first aluminum alloy powder into a first powder preform 15, the a compacting pressure was set at 5 tons/cm², and the relative density of the first powder preform 15 was of about 80%. In a compaction of the first aluminum alloy powder into a second powder preform 18, the compacting pressure was set at 5 tons/cm², and the relative density of the second powder preform 18 was of about 80%. In a high frequency induction heating step, the powder preforms 15 and 18 were heated for 4 minutes up to 580° C. (853 K) and maintained at such temperature for 10 seconds for degassing. In a forging K), and the pressing force was set at 8 tons/cm². The powder preforms 15 and 18, after being heated, were immediately subjected to this forging step. The relative density of formed rod member 3 and cap 6 after the forging step was of 99.8% or more. Mating faces 8 and 10 of the rod member 3 and the cap 6 were provided with an infinite number of recesses and projections $a_1$, $a_2$, $b_1$, $b_2$. The weight of the connecting rod $C_1$ after being machined was 320 g.

EXAMPLE B

A connecting rod $C_2$ having the same construction as in Example A was produced under the same conditions as in Example A, except that the second aluminum alloy powder was used as the material for the cap 6. In this connecting rod $C_2$, the opposed mating faces 8 and 10 of the rod member 3 and the cap 6 were provided with an infinite number of recesses and projections $a_1$, $a_2$, $b_1$, $b_2$ that were formed or cut deeper than those in Example A, apparently due to the different materials used for the two components. The weight of the connecting rod $C_2$ after being machined was 316 g.

COMPARATIVE EXAMPLE

Figure 6:
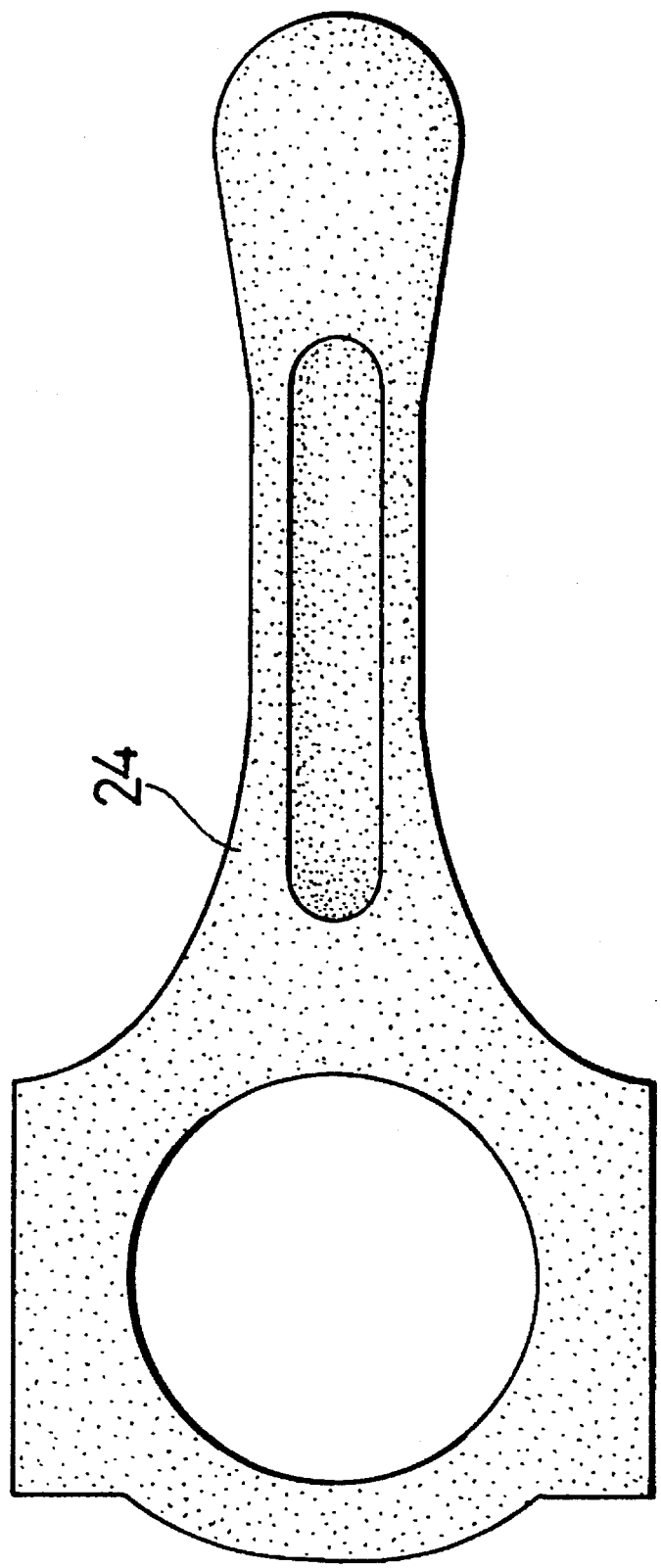
FIG. 6 is a plan view of one example of an integral type Powder preform.

As shown in FIG. 6, for a Comparative Example the first aluminum alloy powder was subjected to a cold compaction to produce an integral powder preform 24 having a shape similar to that of the combined first and second powder preforms 15 and 18 connected to each other. The compacting pressure was set at 5 tons/cm², and the relative density of the integral powder preform 24 was of about 80%. Thereafter, the integral powder preform 24 was subjected in sequence to heating and forging under the same conditions as in Example A to produce an integral connecting rod blank. Then, the integral connecting rod blank was subjected to a cutting step for division into a rod member 3 and a cap 6, and then to a finish machining step for forming flat mating faces 8 and 10, thereby producing a connecting rod $C_3$. The weight of the connecting rod $C_3$ after being machined was 320 g.

Figure 7:
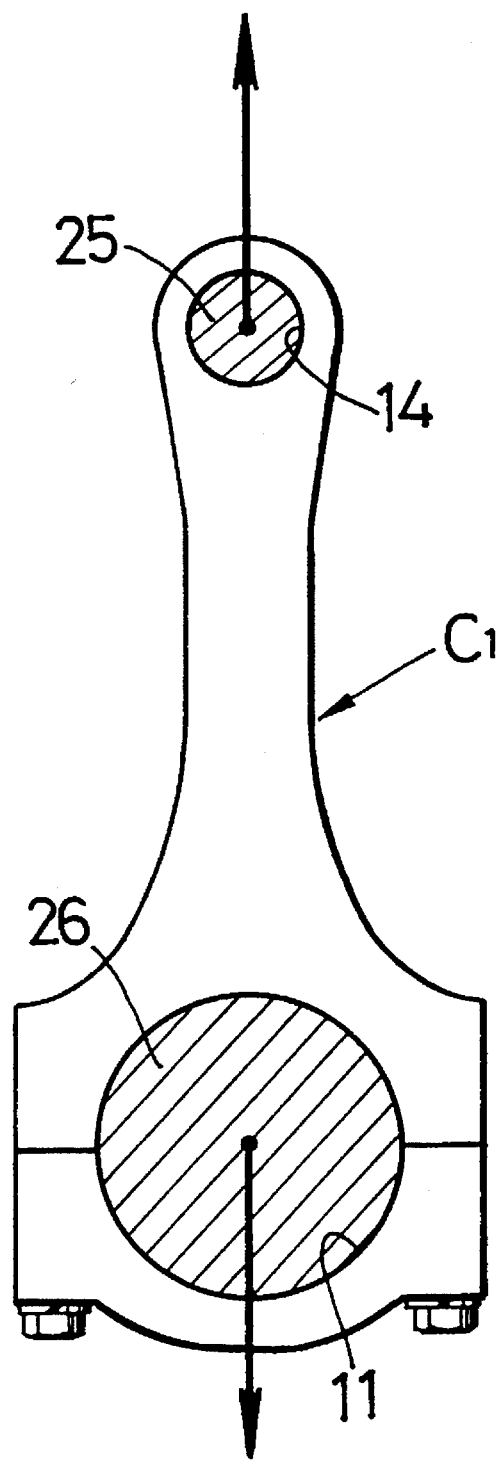
FIG. 7 is a view illustrating a simplex fatigue test for a connecting rod.

A conventional simplex fatigue test was carried out for the connecting rods $C_1$, $C_2$ and $C_3$ produced in Examples A and B and the Comparative Example, respectively, as shown in FIG. 7. This test was performed by inserting rods 25 and 26 through the piston pin hole 14 and the crank pin hole 11 in the connecting rod $C_1$, for example, supporting the opposite ends of each of the rods 25 and 26 on a hydraulic fatigue testing machine, and repeatedly applying a tensile load to the connecting rod $C_1$ at a temperature of 150° C. (423 K) and at R (=minimum stress/ maximum stress) equal to 0.1.

Figure 8:
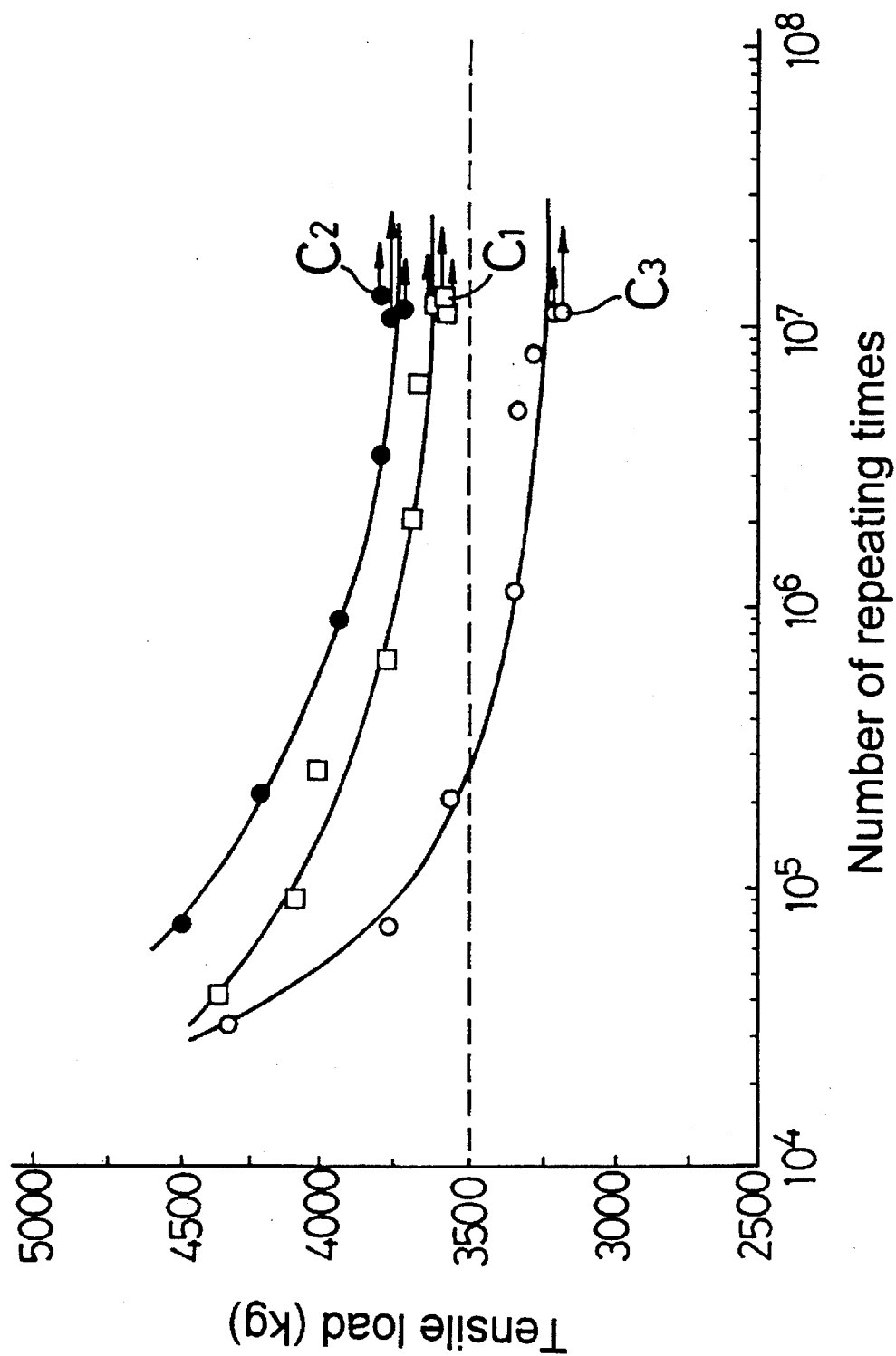
FIG. 8 is a graph illustrating results of the simplex fatigue test for various connecting rods.

FIG. 8 illustrates results of the simplex fatigue test for the connecting rods $C_1$, $C_2$, and $C_3$. In this type of fatigue test, it is generally accepted that the $10_7$ number of times or cycles of applying the endurance load for a practical connecting rod is required to be at least 3,500 kg, as shown by the dashed line in FIG. 8.

As is apparent from FIG. 8, the connecting rods $C_1$ and $C_2$ of Examples A and B satisfy the above-described requirement. This is attributable to the fact that any possible misalignment, as described above, between the mating faces 8 and 10 of the rod member 3 and the cap 6 is prevented by the recesses and the projections $a_1$, $a_2$, $b_1$, $b_2$, and hence, both the rod member 3 and the cap 6 receive the stress.

In contrast, the $10_7$ times application of the endurance load for the connecting rod $C_3$ of the Comparative Example is 3,200 kg and thus, this connecting rod does not satisfy such requirement. In the connecting rod $C_3$, there was a rupture generated beginning at the large end shoulder S (see FIG. 1) as a starting point. This is due to the fact that a misalignment, as described above, was produced over-time between the mating faces 8 and 10 of the rod member 3 and the cap 6 and, as a result, only the rod member 3 received the stress.

With regard to the weight of the connecting rods, the weight of the connecting rod $C_1$ is 320 g; the weight of the connecting rod $C_2$ is 316 g; and the weight of a steel connecting rod having the same volume as those of the rods $C_1$ and $C_2$ is 540 g. Therefore, in the connecting rods $C_1$ and $C_2$, a reduction of about 40% in weight was achieved as compared with the steel connecting rod. This reduction in weight enables the maximum number of revolutions per minute of an internal combustion engine to be increased by about 650 rpm. In addition, with the reduction in number of manufacturing steps, the manufacturing cost can be reduced by about 3%.

Figure 9:
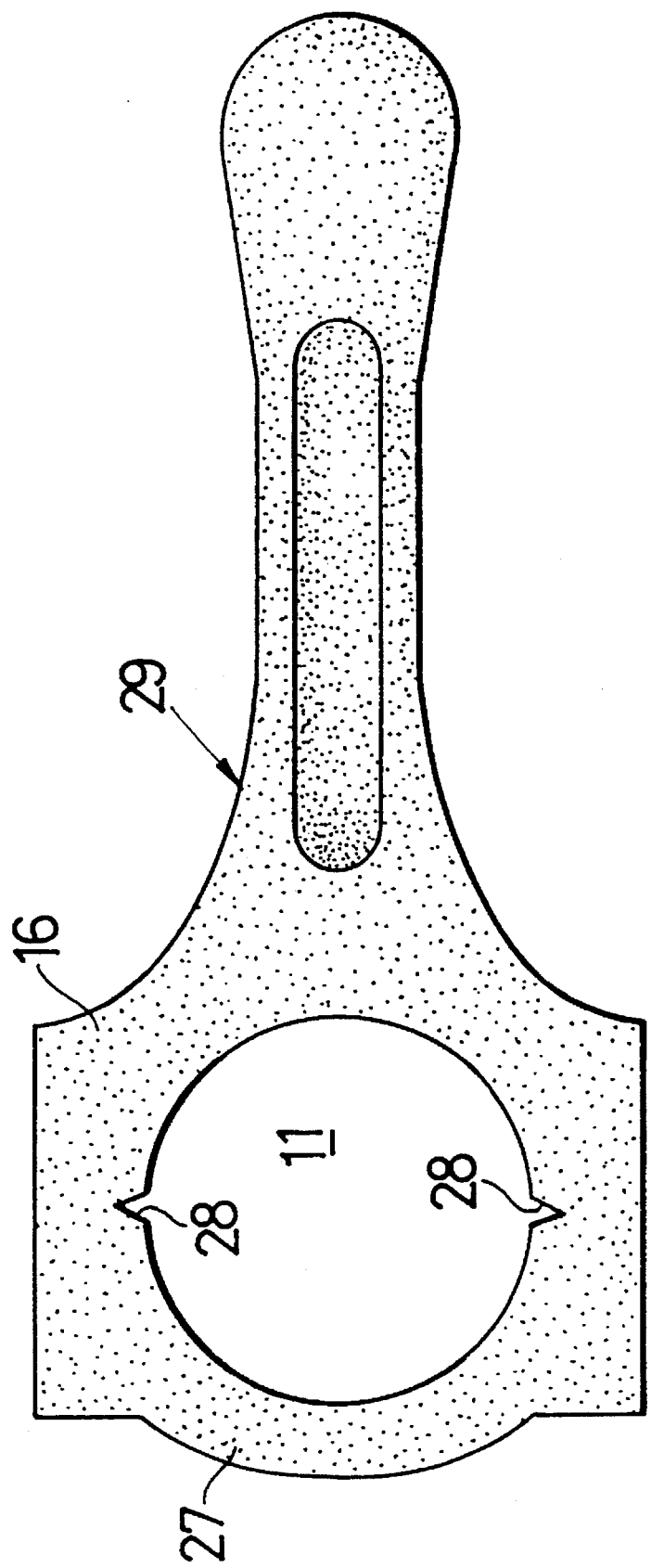
FIG. 9 is a plan view of prior art example of an integral type Powder preform.

There is a known prior art producing process for a similar purpose as in the present invention (for example, see U.S. Pat. No. 4,923,674, which comprises subjecting a steel powder to a cold compaction in a mold to form a powder preform 29 (see FIG. 9) which is of an integral preform type, as in the above-described Comparative Example, and which has notches 28 at opposite boundaries between a portion 16 corresponding to the semi-annular portion 2 and a portion 27 corresponding to the cap 6 and in the inner peripheral surface of the crank pin hole 11. The powder preform 29 is subjected to a forging step to provide an integral type connecting rod blank and then breaking the integral type connecting rod blank into a rod member 3 and cap 6 by pulling apart at the notches 28 to cause splits due to both the notches 28.

Figure 10:
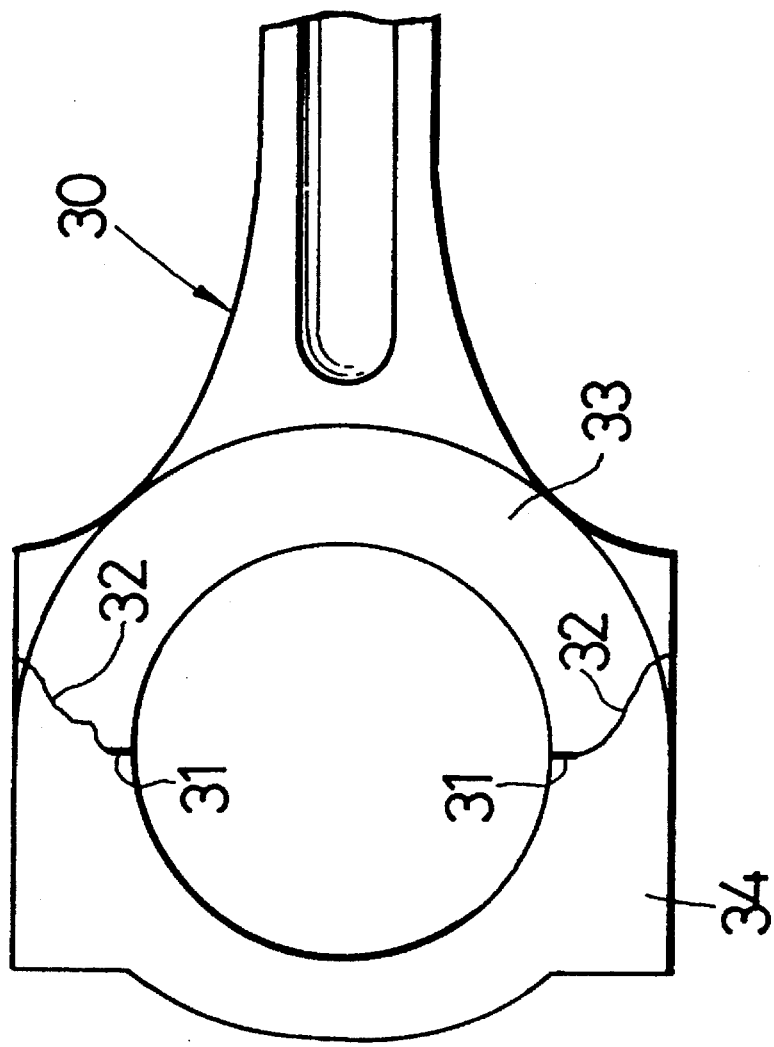
FIG. 10 is a plan view of another connecting rod blank.

For the purpose of utilizing or testing this technique, an integral connecting rod 30 (see FIG. 10) was made using the first aluminum alloy powder and was broken by pulling. As a result, the break lines advanced obliquely from both the splits 31, formed comparable to the notches 28, and a portion of a section extending along the break line 32 was plastically deformed whereby the rod member portion 33 and the cap portion 34 failed to match with each other upon attempting to reassemble the portions.

If an aluminum allow powder having a low toughness is used, then the break line advances substantially straightly, but such an alloy is unsuitable as an aluminum alloy for a connecting rod.

Thus, it has been ascertained that it is impossible to utilize the above-described prior art steel powder process as a process for producing a connecting rod of aluminum alloy.

In the production of a connecting rod of aluminum alloy by utilization of a powder forging technique, in order to increase the strength and toughness of the connecting rod, various studies were made for the composition of the aluminum alloy powder and the process for producing the same to provide a result which will be described below.

There are conventionally known aluminum alloy powders for powder forging, wherein the Si content is set in a range represented by Si≧4.0% by weight in order to provide an increased strength of a structural member such as a connecting rod (for example, see Japanese Patent Application Laid-Open No. 78708/93). However, aluminum alloy powder is accompanied by a problem that if the Si content is set in the range represented by Si≧4% by weight, a produced structural member has a reduced toughness due to the fact that a Si crystal is contained in the metallographic structure thereof.

As a result, the present inventors have developed an aluminum alloy powder in which the above problem can be solved by a composition comprising Fe in a content of 7% by weight ≦Fe≦15% by weight, Si in a content of 1% by weight ≦Si<4% by weight, at least one alloy element X selected from the group consisting of Ti, Zr, Mn, Ni, Cr, V, Mg and Mm (Misch metal) in a content of 1% by weight ≦X≦3% by weight, and the balance of Al (which may contain unavoidable impurities in some cases), and which is produced by utilizing an air atomizing process.

In this aluminum alloy powder, because the Si content is set smaller than 4% by weight, the Si crystal cannot be produced, and the requirement for increasing the toughness is satisfied. A lack of strength with a reduction in Si content is compensated for by Fe and X by specifying the Fe and X contents in the above manner.

On the other hand, if an air atomizing process is utilized in the production of aluminum alloy powder, particles of the resulting aluminum alloy powder are non-spherical and irregular in shape. If a green compact formed from this aluminum allow powder is compared with a green compact formed from a substantially annular-shaped aluminum alloy powder produced by a gas atomizing process, a compaction-deforming ability of individual particles of the former aluminum alloy powder in a powder forging course is higher than that of the latter aluminum alloy powder, leading to a better bondability of particles to one another.

Because a rapid heating for a short time is employed in carrying out the powder forging process, the metallographic structures of the aluminum alloy powder of the above-described composition is not made coarser, and the forging temperature Tf therefor can be set in a high temperature range, e.g., in a range of 550° C. (823 K)<Tf <650° C. (923 K). Therefore, the deforming resistance of the aluminum alloy powder can be lowered to enhance the compatibility thereof.

Thus, the bonding force between the aluminum alloy powder particles can be increased, and the coarsening and deuniformization of the metallographic structure can be suppressed, thereby producing an aluminum alloy connecting rod having a high strength and a high toughness.

However, an Fe content less than 7% by weight will bring about a reduced strength of a produced connecting rod and, on the other hand, an Fe content of more than 15% by weight will result in a reduced toughness of a produced connecting rod. A Si content less than 1% by weight will provide a reduced toughness of a produced connecting rod, because an AlX-based intermetallic compound will be crystallized or precipitated, and on the other hand, a Si content equal to or more than 4%, by weight will likewise provide a reduced toughness of a produced connecting rod as a result of precipitation of Si crystal. With an X content less than 1% by weight, a produced connecting rod has a reduced toughness, because an AlFeSi-based intermetallic compound and an AlFe-based intermetallic compound are needle-crystallized. On the other hand, with an X content more than 3% by weight, a produced connecting rod likewise has a reduced toughness, because an AlX-based intermetallic compound and an AlXSi-based intermetallic compound are crystallized or precipitated in a coalesced manner.

The strength, toughness and the like of the forgings produced using the above-described aluminum alloy powder now will be considered.

EXAMPLE 1

(A) Molten metals having various aluminum alloy compositions were prepared with varied contents of Fe, Si, Ti and Mg and then subjected to an air atomizing process to produce various aluminum alloy powders having different compositions. Thereafter, each of the aluminum alloy powders was subjected to a classification to select aluminum alloy powder particles having a particle size (longitudinal length) equal to or less than 150 μm.

Each of thirteen different aluminum alloy powders comprised of particles having a particle size equal to or less than 150 μm was subjected to a cold compaction under a compacting pressure of 4 tons/cm² to provide a disk-like powder preform having a diameter of 75 mm and a thickness of 27 mm.

Each powder preform was placed separately into a high frequency induction heating furnace, where it was heated for about of 5 minutes up to a forging temperature Tf, i.e., 570° C. and maintained at this temperature for 10 seconds for degassing. Then, each powder preform was placed into a die heated to 200° C. in a powder forging machine, where it was subjected to a powder forging under conditions of a forging temperature Tf of 570° C. and a compressing pressure 7 tons/cm² to form a disk-like forging having a diameter of 78 mm and a thickness of 20 mm. Then, the forging was immediately cooled with water.

Figure 11:
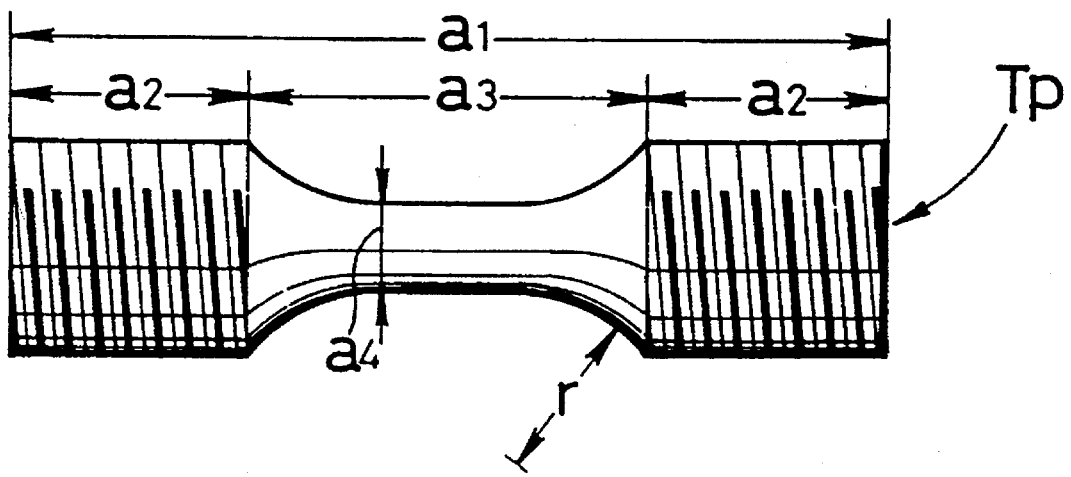
FIG. 11 is a front view of a tensile test piece.

A tensile test piece as shown in FIG. 11 was fabricated from each of the forgings. In the tensile test piece shown in FIG. 11, length $a_1$=52 mm; length $a_2$ of threaded portion =14 mm; length $a_3$ between both the threaded portion =24 mm; diameter $a_4$ of a smaller diameter portion =4.8 mm; radius r of a portion between the smaller diameter portion and the threaded portion =10 mm; nominal size of threads M12, pitch =1.25. These test pieces were subjected to a tensile test at room temperature. Charpy impact test pieces having a size of 5 mm X 5 mm X 55 mm and no notch were also fabricated and subjected to Charpy impact test.

Table 2 shows the compositions of the forgings (1) through (13) and the results of the tests. In Table 2, unavoidable impurities may be contained in the balance at the column of Al.

TABLE 2

| Forging | Chemical composition (% by weight) | | | | | Tensile strength at room temperature (MPa) | Breaking elongation (%) | Charpy impact value (J/mm²) |
| --- | --- | --- | --- | --- | --- | --- | --- | --- |
| | Fe | Si | Ti | Mg | Al | | | |
| (1) | 7 | 2 | 1 | — | Balance | 498 | 6.9 | 0.28 |
| (2) | 10 | 3 | 2 | — | Balance | 503 | 6.7 | 0.28 |
| (3) | 15 | 3 | 3 | — | Balance | 506 | 6.5 | 0.27 |
| (4) | 10 | 1 | 2 | — | Balance | 500 | 6.7 | 0.26 |
| (5) | 10 | 2 | 2 | — | Balance | 502 | 6.6 | 0.27 |
| (6) | 10 | 3.5 | 2 | — | Balance | 497 | 6.6 | 0.25 |
| (7) | 7 | 2 | 2 | — | Balance | 496 | 6.9 | 0.26 |
| (8) | 15 | 2 | 2 | — | Balance | 511 | 6.6 | 0.25 |
| (9) | 10 | 2 | 1 | — | Balance | 498 | 6.7 | 0.29 |
| (10) | 10 | 2 | 3 | — | Balance | 500 | 6.6 | 0.28 |
| (11) | 10 | 2 | 1 | 0.5 | Balance | 507 | 6.0 | 0.29 |
| (12) | 10 | 2 | 1 | 1 | Balance | 508 | 6.1 | 0.29 |
| (13) | 10 | 2 | 1 | 2 | Balance | 510 | 5.9 | 0.26 |

Eight other forged aluminum alloy test pieces having different compositions were prepared in the same manner as described above as Comparative Examples. Table 3 shows the compositions of these forgings (1a) through (8a) as Comparative Examples and the results of the tests. In Table 3, unavoidable impurities may be contained in the balance at the column of Al.

To ensure that the forging is of a high toughness, the Charpy impact value thereof is required to be equal to or more than 0.20 J/mm². A Charpy impact value less than 0.20 J/mm² will cause a fracture under a stress lower than the intrinsic strength, wherein it advances at an early stage from a notch-like portion, e.g., a valley of an internal threaded bore, as the toughness of the forging is reduced.

TABLE 3

| Forging (comparative examples) | Chemical composition (% by weight) | | | | | Tensile strength at room temperature (MPa) | Breaking elongation (%) | Charpy impact value (J/mm²) |
| --- | --- | --- | --- | --- | --- | --- | --- | --- |
| | Fe | Si | Ti | Mg | Al | | | |
| (1a) | 15 | 4 | 3 | — | Balance | 510 | 4.3 | 0.06 |
| (2a) | 10 | 0.5 | 2 | — | Balance | 430 | 2.0 | 0.06 |
| (3a) | 10 | 4 | 2 | — | Balance | 503 | 4.0 | 0.07 |
| (4a) | 6 | 2 | 2 | — | Balance | 380 | 7.3 | 0.30 |
| (5a) | 16 | 2 | 2 | — | Balance | 513 | 4.0 | 0.05 |
| (6a) | 10 | 2 | 0.5 | — | Balance | 432 | 6.9 | 0.06 |
| (7a) | 10 | 2 | 3.5 | — | Balance | 508 | 4.1 | 0.06 |
| (8a) | 10 | 2 | 1 | 2.5 | Balance | 513 | 3.0 | 0.07 |

As is apparent from the comparison of Tables 2 and 3, each of the forgings (1) to (13), because of the composition thereof falls into the above-described range, has a relatively high strength and breaking elongation percent, and a Charpy impact value considerably increased as compared with those of the forgings (1a) to (3a) and (5a) to (8a) and hence, has a high toughness. The forging (4a) of the Comparative Examples has a toughness which is acceptable but has a low strength.

(B) To confirm the preferred forging temperature Tf, various forgings ($9_1$) to ($9_4$) were produced in the same manner by using the aluminum allow powder used in the production of the forging (9) shown in Table 2 and having a composition comprising 10% by weight of Fe, 2% by weight of Si, 1% by weight of Ti, and the balance of Al, except that the forging temperature Tf was varied.

Tensile test pieces similar to those described above were fabricated from the forgings ($9_1$) to ($9_4$) and subjected to a tensile test at room temperature. Charpy impact test pieces similar to those described above were also fabricated and subjected to Charpy impact test.

Table 4 shows the forging temperature and test results for the forgings (9) from Table 2 and ($9_n$) to ($9_4$).

TABLE 4

| Forging | Forging temperature Tf (°C.) | Tensile strength at room temperature (MPa) | Breaking elongation (%) | Charpy impact value (J/mm$^2$) |
|---|---|---|---|---|
| ($9_1$) | 500 | 413 | 0.3 | 0.05 |
| ($9_2$) | 550 | 503 | 2.1 | 0.15 |
| (9) | 570 | 498 | 6.7 | 0.29 |
| ($9_3$) | 600 | 490 | 6.8 | 0.31 |
| ($9_4$) | 650 | 370 | 7.0 | 0.35 |

As is apparent from Table 4, it is possible to achieve increases in strength and toughness of the forging by setting the forging temperature Tf in a range of 550° C. <Tf<650° C. If the forging temperature Tf is equal to or lower than 550° C., an increase in strength is achieved in a produced forging, but the forging has a lower toughness, because of an insufficient bonding force between the aluminum alloy powder particles. On the other hand, if the forging temperature Tf is equal to or higher than 650° C., an increase in toughness is achieved in a produced forging, but the forging has a lower strength, because of a coalesced metallographic structure of the aluminum alloy powder.

EXAMPLE 2

A molten metal of an alloy having a composition comprising 10% by weight of Fe, 2% by weight of Si, 2% by weight of X and the balance of Al (containing unavoidable impurities) was prepared (wherein X is one alloy element selected from the group consisting of Zr, Mn, Ni, Cr, V, Mg and Mm (Misch metal)). Then, various forgings (14) to (20) were produced in the same manner as in Example 1.

Tensile test pieces similar to those described above were fabricated from the forging and subjected to a tensile test at room temperature. Charpy impact test pieces similar to those described above were also fabricated and subjected to a Charpy impact test.

Table 5 shows the type of alloy element X and the results of the tests for the forgings (14) to (20).

TABLE 5

| Forging | type of alloy element X | Tensile strength at room temperature (MPa) | Breaking elongation (%) | Charpy impact value (J/mm$^2$) |
|---|---|---|---|---|
| (14) | Zr | 498 | 6.4 | 0.28 |
| (15) | Mn | 501 | 6.9 | 0.26 |
| (16) | Ni | 499 | 6.5 | 0.28 |
| (17) | Cr | 503 | 6.2 | 0.28 |
| (18) | V | 509 | 6.0 | 0.27 |
| (19) | Mg | 488 | 7.0 | 0.28 |
| (20) | Mm | 492 | 6.8 | 0.26 |

It can be seen from Table 5 that each of the forgings has a high strength and a high toughness, comparable to the forgings (1) to (13) shown in Table 2 in Example 1.

To confirm the superiority of the forgings (1) to (20), Comparative Examples 1 to 4 were carried out.

COMPARATIVE EXAMPLE 1

A molten metal having a Al-Si based alloy composition shown in Table 6 was prepared.

TABLE 6

| | Chemical composition (% by weight) | | | | | | | | |
|---|---|---|---|---|---|---|---|---|---|
| | Si | Cu | Mg | Mn | Fe | Ni | Cr | Zr | Al |
| Al-Si based alloy | 25.0 | 2.1 | 0.7 | 1.0 | 3.2 | Very Small | 0.4 | 0.7 | Balance |

Then, the molten metal was subjected to an air atomizing process to produce an aluminum alloy powder. Thereafter, the aluminum alloy powder was subjected to a classification to select aluminum alloy powder particles having a particle size (longitudinal length) equal to or less than 150 µm. The aluminum alloy powder comprised of the particles having a particle size equal to or less than 150 µm was subjected to a cold compaction under a condition of a compacting pressure of 4 tons/cm$^2$ to provide a disk-like powder preform having a diameter of 75 mm and a thickness of 27 mm.

The powder preform was placed into a high frequency induction heating furnace, where it was heated for about 4 minutes up to 520° C. and maintained at this temperature for 10 seconds for degassing. Then, the powder preform was placed into a mold heated to 200° C. in a powder forging machine, where it was subjected to a powder forging under a compressing pressure 7 tons/cm$^2$ to form a disk-like forging having a diameter of 78 mm and a thickness of 20 mm. Then, the forging was immediately cooled with water.

After being cooled with water, the forging was subjected to an aging treatment under conditions of 170° C. and 10 hours.

A tensile test piece similar to those described above was fabricated from the forging and subjected to a tensile test at room temperature. A Charpy impact test piece was also fabricated and subjected to a Charpy impact test.

As a result, it was ascertained that the forging had a high tensile strength of 500 MPa at room temperature, but had a breaking elongation of 0% and a Charpy impact value of 0.05 J/mm$^2$, and hence, had an extremely low toughness. This is due to an extremely high Si-content in the Al-Si based alloy.

COMPARATIVE EXAMPLE 2

Various molten metals were prepared which had an Al—Fe—Si—X based alloy composition in which the Fe, Si and X contents fell into specified ranges, respectively. Then, the molten metals were subjected to an Ar gas atomizing process to produce various aluminum alloy powders comprised of substantially spherical particles. Thereafter, using the aluminum alloy powders, various forgings (9a) to (16a) were produced in the same manner as in Example 1.

Tensile strength test pieces similar to those described above were fabricated from the forgings (9a) to (16a) and subjected to a tensile strength test at room temperature. Charpy impact test pieces similar to those described above were also fabricated and subjected to a Charpy impact test.

Table 7 shows the compositions of the forgings (9a) to (16a) and the results of the tests therefor. In Table 7, unavoidable impurities may be contained in the balance at the column of Al.

7, these deficiencies are due to a low compaction deformability and a poor bondability of the individual aluminum alloy powder particles forming a powder preform in a powder forging course because of the use of the aluminum alloy powders comprised of the substantially spherical particles produced through the Ar gas atomizing process.

COMPARATIVE EXAMPLE 3

Using the aluminum alloy powders described in Comparative Example 2, made through the Ar gas atomizing process and comprised of particles having a particle size equal to or less than 150 μm, various short columnar billets (powder preforms) having a diameter of 80 mm and a length of 80 mm were produced by a cold compaction under a condition of a compacting pressure of 4 tons/cm$^2$. Each of the billets was placed into an aluminum container and subjected to a vacuum degassing treatment at 300° C., and then, a venting hole of the container was closed. Each billet sealed in the container was subjected to a hot extrusion under conditions of an extruding temperature of 300° C. and an extrusion ratio of about 7.1, thereby producing eight rod-like extrudates (17a) to (24a).

Tensile test pieces similar to those described above were fabricated from the extrudates (17a) to (24a) and subjected to a tensile test at room temperature. Charpy impact test pieces similar to those described above were also fabricated and subjected to a Charpy impact test.

Table 8 shows the compositions of the extrudates (17a) to (24a) and the results of the tests thereof. In Table 8, unavoidable impurities may be contained in the balance at the column of Al.

TABLE 7

| Forging (Comparative examples) | Chemical composition (% by weight) | | | | | Tensile strength at room temperature (MPa) | Breaking elongation (%) | Charpy impact value (J/mm$^2$) |
|---|---|---|---|---|---|---|---|---|
| | Fe | Si | Ti | Mg | Al | | | |
| (9a) | 10 | 3 | 2 | — | Balance | 471 | 0 | 0.06 |
| (10a) | 7 | 2 | 2 | — | Balance | 468 | 0.5 | 0.05 |
| (11a) | 10 | 2 | 1 | — | Balance | 453 | 0.3 | 0.04 |
| (12a) | 10 | 2 | 3 | — | Balance | 471 | 0 | 0.05 |
| (13a) | 7 | 2 | 1 | — | Balance | 456 | 1.1 | 0.05 |
| (14a) | 10 | 2 | 1 | 1 | Balance | 479 | 0.2 | 0.06 |
| (15a) | 7 | 2 | 1 | 1 | Balance | 463 | 0.8 | 0.04 |
| (16a) | 15 | 2 | 2 | — | Balance | 456 | 0 | 0.06 |

As is apparent from the comparison of Tables 7 and 2, each of the forgings (9a) to (16a) in Table 7 has a low strength and a low toughness, as compared with the forgings (1) to (13) in Table 2. In the forgings (9a) to (16a) in Table

TABLE 8

| Extrudate | Chemical composition (% by weight) | | | | | Tensile strength at room temperature (MPa) | Breaking elongation (%) | Charpy impact value (J/mm$^2$) |
|---|---|---|---|---|---|---|---|---|
| | Fe | Si | Ti | Mg | Al | | | |
| (17a) | 10 | 3 | 2 | — | Balance | 623 | 1.8 | 0.05 |
| (18a) | 7 | 2 | 2 | — | Balance | 583 | 3.0 | 0.06 |
| (19a) | 10 | 2 | 1 | — | Balance | 600 | 2.8 | 0.05 |
| (20a) | 10 | 2 | 3 | — | Balance | 620 | 2.5 | 0.06 |
| (21a) | 7 | 2 | 1 | — | Balance | 571 | 3.0 | 0.05 |
| (22a) | 10 | 2 | 1 | 1 | Balance | 598 | 2.4 | 0.05 |
| (23a) | 7 | 2 | 1 | 1 | Balance | 580 | 2.7 | 0.06 |
| (24a) | 15 | 2 | 2 | — | Balance | 631 | 1.0 | 0.05 |

It can be seen from Table 8 that each of the extrudates (17a) to (24a) has a high strength, but has a low toughness.

This is due to the following reason. Because the bonding of aluminum alloy powder particles to one another is realized in the extrusion course, the tensile strength at room temperature of each of the extrudates (17a) to (24a) is enhanced, but the deforming resistance of the billet is high, because of the low extruding temperature, and the metallographic structure is non-uniform due to the extrusion itself. For this reason, the breaking elongation and the Charpy impact value of each of the extrudates (17a) to (24a) are reduced, bringing about a reduction in toughness.

Thus, it was conceived to lower the deforming resistance of the billet by rising the extruding temperature. However, in the extrusion, a portion of the billet remains in the container after completion of the extrusion. The remaining portion is cut off from the extrusion and a front portion of the extrudate, as viewed in an extruding direction, is cut off. Therefore, the billet having a substantially large volume as compared with the extrudate must be used. Thus, a long time is required to heat such a larger billet to a high temperature, e.g., 500° C. or more in order to rise to the extruding temperature. This causes a coalescence of the metallographic structure to bring about a reduction in strength of a produced connecting rod.

COMPARATIVE EXAMPLE 4

Various extrudates (25a) to (29a) were produced in the same manner as in Comparative Example 3, using aluminum alloy powders comprised of particles having a particle size equal to or more than 150 µm and produced through the atomizing process with the same composition as the aluminum alloy powders used in the production of the forgings (1), (2), (9) and (10) shown in Table 2 in Example 1 and the aluminum alloy powder used in the production of the forging (15a) shown in Table 7 in Comparative Example 2.

Tensile test pieces similar to those described above were fabricated from the extrudates (25a) to (29a) and subjected to a tensile test at room temperature. Charpy impact test pieces similar to those described above were also fabricated and subjected to a Charpy impact test.

Table 9 shows the compositions of the extrudates (25a) to (29a) and the results of the tests thereof. In Table 9, unavoidable impurities may be contained in the balance at a column of Al.

It will be understood that the present invention is not limited to connecting rods and the processes for the producing the same, and for example, may be also applied to split bearing members and processes for producing the same.

What is claimed is:

1. A process for producing a shaft clamping member comprising first and second halves each of which has opposed mating faces at circumferential opposite ends of a semi-circular recess, said first and second halves being fastened to each other by a plurality of threaded members in a state where the opposed mating faces of both the halves are matched to each other to define a shaft-receiving hole by the two semi-circular recesses, said process comprising the steps of:

forming first and second preforms of light alloy material having shapes approximating those of the first and second halves, heating both said preforms to a forging temperature Tf, placing both said preforms into a cavity in a mold having a shape of said shaft clamping member such that surfaces of said preforms corresponding to said opposed mating faces are adjacently positioned and opposed to each other, subjecting the first and second preforms simultaneously to a forging step to thereby cause said light alloy material to flow and form said first and second halves having an infinite number of recesses and projections in a fitted relation to each other on the opposed mating faces, said recesses and projections being formed due to said light alloy material flowing between the opposed surfaces of said preforms during the forging step, and fitting said recesses and projections on said mating faces to each other when fastening said first and second halves by said threaded members.

2. A process for producing a shaft clamping member according to claim 1, wherein each of said first and second preforms is a powder preform of aluminum alloy powder, and said forging step used is a powder forging.

3. A process for producing a shaft clamping member according to claim 2, wherein said aluminum alloy powder has a composition comprising Fe, Si, and at least one alloy element X selected from the group consisting of Ti, Zr, Mn, Ni, Cr, V, Mg and Mm (Misch metal) in contents representing 7% by weight $\leq$Fe$\leq$15% by weight, 1% by weight$=$Si<4% by weight, and 1% by weight $\leq$X$\leq$3 % by weight,

TABLE 9

| Extrudate | Chemical composition (% by weight) | | | | | Tensile strength at room temperature (MPa) | Breaking elongation (%) | Charpy impact value (J/mm$^2$) |
|---|---|---|---|---|---|---|---|---|
| | Fe | Si | Ti | Mg | Al | | | |
| (25a) | 7 | 2 | 1 | — | Balance | 560 | 3.1 | 0.05 |
| (26a) | 10 | 3 | 2 | — | Balance | 613 | 1.9 | 0.05 |
| (27a) | 15 | 2 | 2 | — | Balance | 620 | 1.1 | 0.04 |
| (28a) | 10 | 2 | 1 | — | Balance | 591 | 3.0 | 0.06 |
| (29a) | 7 | 2 | 1 | 1 | Balance | 573 | 3.0 | 0.06 |

It can be seen from Table 9 that each of the extrudates (25a) to (29a) has a high strength, but has a low toughness. This is due to the same reason as that described in Comparative Example 3.

with the balance of Al,, and said aluminum alloy powder is produced by application of an air atomizing process.

4. A process for producing a shaft clamping member according to claim 3, wherein said forging temperature Tf is set in a range of 550° C.<Tf<650° C.

* * * * *

UNITED STATES PATENT AND TRADEMARK OFFICE
CERTIFICATE OF CORRECTION

PATENT NO. : 5,566,449 Page 1 of 1
DATED : October 22, 1996
INVENTOR(S) : Okamoto et al.

It is certified that error appears in the above-identified patent and that said Letters Patent is hereby corrected as shown below:

<u>Title page,</u>
Item [57], ABSTRACT,
Lines 19 and 20, after "Fe" and before "15%", delete "<" and insert -- ≤ -- and after "1%" and before "Si" delete "<" and insert -- ≤ --.

<u>Column 16</u>
Line 45, after "1% by weight" delete the equal sign "=" and insert -- ≤ --.

Signed and Sealed this

Sixth Day of August, 2002

Attest:

JAMES E. ROGAN
*Attesting Officer* *Director of the United States Patent and Trademark Office*